United States Patent
Lee et al.

(10) Patent No.: US 9,291,827 B2
(45) Date of Patent: Mar. 22, 2016

(54) MOBILE TERMINAL AND METHOD FOR FABRICATING IMAGE MODULE PROVIDED THEREON

(71) Applicants: Jaeeon Lee, Suwon (KR); Jongyeon Shin, Incheon (KR); Taekyoon Bae, Seoul (KR); Gihoon Tho, Seoul (KR)

(72) Inventors: Jaeeon Lee, Suwon (KR); Jongyeon Shin, Incheon (KR); Taekyoon Bae, Seoul (KR); Gihoon Tho, Seoul (KR)

(73) Assignee: LG Electronics Inc., Seoul (KR)

( * ) Notice: Subject to any disclaimer, the term of this patent is extended or adjusted under 35 U.S.C. 154(b) by 271 days.

(21) Appl. No.: 13/782,128

(22) Filed: Mar. 1, 2013

(65) Prior Publication Data

US 2013/0242385 A1    Sep. 19, 2013

Related U.S. Application Data

(60) Provisional application No. 61/605,828, filed on Mar. 2, 2012, provisional application No. 61/611,681, filed on Mar. 16, 2012, provisional application No. 61/667,065, filed on Jul. 2, 2012.

(30) Foreign Application Priority Data

Sep. 10, 2012 (KR) .................. 10-2012-0100056

(51) Int. Cl.
  *G02B 27/22*    (2006.01)
  *H04M 1/02*    (2006.01)
(52) U.S. Cl.
  CPC ............. *G02B 27/22* (2013.01); *H04M 1/0283* (2013.01)
(58) Field of Classification Search
  None
  See application file for complete search history.

(56) References Cited

U.S. PATENT DOCUMENTS

| 2009/0072526 | A1* | 3/2009 | Peters et al. ................. 283/85 |
| 2009/0304993 | A1* | 12/2009 | Yoshikawa et al. ........... 428/141 |
| 2010/0254007 | A1 | 10/2010 | Toda |
| 2011/0096477 | A1 | 4/2011 | Wang |
| 2012/0015157 | A1 | 1/2012 | Chen et al. |

FOREIGN PATENT DOCUMENTS

| CN | 101208939 A | 6/2008 |
| CN | 101754611 A | 6/2010 |
| DE | 102007044992 | 12/2008 |
| EP | 2 077 459 A1 | 7/2009 |
| KR | 10-2010-0064464 | 6/2010 |
| TW | 201202061 A | 1/2012 |
| WO | WO 2007/001038 | 1/2007 |

OTHER PUBLICATIONS

European Search Report for Application No. 13156258.9, dated Jun. 5, 2013.
Chinese Office Action issued in Application No. 201310066126.4 dated Mar. 30, 2015.
European Office Action for Application No. 13156258.9 dated Jan. 29, 2016.

* cited by examiner

*Primary Examiner* — Jade R Chwasz
(74) *Attorney, Agent, or Firm* — KED & Associates LLP

(57) ABSTRACT

A mobile terminal comprises a terminal body, and an image module mounted onto the terminal body to provide an externally exposed stereoscopic image. The image module includes an optically transmissive layer made of an optically transmissive material, a pattern layer made of an optically transmissive material and protruding from a rear surface of the optically transmissive layer in a shape corresponding to the image, and a reflection layer disposed to cover the pattern layer to reflect at least part of light incident onto the pattern layer toward a front surface of the optically transmissive layer.

12 Claims, 11 Drawing Sheets

TRANSPARENT LAYER

FORM PATTERN LAYER

FORM REFLECTION LAYER

FORM COLOR LAYER

FORM PROTECTION LAYER

ETCHING

MOBILE TERMINAL AND METHOD FOR FABRICATING IMAGE MODULE PROVIDED THEREON

CROSS-REFERENCE TO RELATED APPLICATION

Pursuant to 35 U.S.C. §119(a), this application claims the benefit of earlier filing date and right of priority to U.S. Provisional Application No. 61/605,828, filed on Mar. 2, 2012, U.S. Provisional Application No. 61/611,681, filed on Mar. 16, 2012, U.S. Provisional Application No. 61/667,065, filed on Jul. 2, 2012, and Korean Application No. 10-2012-0100056, filed on Sep. 10, 2012, the contents of which is incorporated by reference herein in its entirety.

BACKGROUND OF THE INVENTION

1. Field of the Invention

This specification relates to a mobile terminal having an image module capable of providing a stereoscopic or three-dimensional image, and a method for fabricating the image module.

2. Background of the Invention

Mobile terminals are electronic devices which are portable and have at least one of voice and telephone call functions, information input and/or output functions, a data storage function and the like.

As it becomes multifunctional, the mobile terminal can be allowed to capture still images or moving images, play music or video files, play games, receive broadcast and the like, so as to be implemented as an integrated multimedia player.

As the mobile terminals are regarded as personal belongings to express personalities, various design forms are required. Such design forms include structural changes and improvement for making an appearance of the mobile terminal better.

As one example of the structural changes and improvement, studies on implementing icons, logos, patterns and the like on mobile terminals are being conducted. Therefore, a more sophisticated mobile terminal by way of giving visual effects to an image may be taken into account.

SUMMARY OF THE INVENTION

Therefore, an aspect of the detailed description is to provide a mobile terminal having a more sophisticated image, and a fabricating method for implementing the same.

To achieve these and other advantages and in accordance with the purpose of this specification, as embodied and broadly described herein, there is provided a mobile terminal including a terminal body, and an image module mounted onto the terminal body to provide an externally exposed stereoscopic image, wherein the image module may include an optically transmissive layer made of an optically transmissive material, a pattern layer made of an optically transmissive material and protruding from a rear surface of the optically transmissive layer in a shape corresponding to the image, and a reflection layer disposed to cover the pattern layer to reflect at least part of light incident onto the pattern layer toward a front surface of the optically transmissive layer.

In accordance with one exemplary embodiment of the present disclosure, the pattern layer may be formed in a printing or UV molding manner.

In accordance with another exemplary embodiment of the present disclosure, the pattern layer may include first and second protrusions providing different stereoscopic effects from each other according to a viewing angle. The first and second protrusions may extend in different directions from each other along the rear surface of the optically transmissive layer. Or, the first and second protrusions may have different shapes from each other. For example, the first and second protrusions may have different thicknesses from each other or be inclined by different angles with respect to the optically transmissive layer.

In accordance with another exemplary embodiment of the present disclosure, the reflection layer may be made of a metal or mirror ink.

In accordance with one exemplary embodiment of the present disclosure, the optically transmissive layer is disposed to cover a display mounted within the terminal body, and portions corresponding to the display may be removed from the pattern layer and the reflection layer through chemical etching.

In accordance with another exemplary embodiment of the present disclosure, the reflection layer may be etched through chemical etching to have a higher surface roughness. Here, the reflection layer may be formed in a concave-convex shape through the chemical etching, to disperse light incident onto the pattern layer.

In accordance with another exemplary embodiment of the present disclosure, the image module may further include a logo section formed by removing portions corresponding to a logo from the pattern layer and the reflection layer through chemical etching, so as to realize the logo.

In accordance with another exemplary embodiment of the present disclosure, the image module may further include a color layer disposed to cover the reflection layer and having a color or texture, to provide the color or texture to the image module.

In accordance with another exemplary embodiment of the present disclosure, the pattern layer may include first and second protrusions disposed with being spaced apart from each other to provide different stereoscopic effects from each other according to a viewing angle, and the color layer may be filled between the first protrusion and the second protrusion.

To achieve these and other advantages and in accordance with the purpose of this specification, as embodied and broadly described herein, there is provided a mobile terminal including a terminal body, and a battery cover detachably mounted onto the terminal body to provide an externally exposed stereoscopic image, wherein the battery cover may include a base member made of synthetic resin, a color layer disposed to cover the base member and having a color or texture, a reflection layer protruding from the color layer in a shape corresponding to the image to reflect at least part of incident light, a first pattern layer laminated on the reflection layer by a predetermined thickness, and an optically transmissive layer made of an optically transmissive material and disposed to cover the color layer and the first pattern layer.

In accordance with one exemplary embodiment of the present disclosure, the battery cover may further include a second pattern layer formed between the color layer and the reflection layer and protruding in a predetermined pattern to realize the image together with the first pattern layer.

Here, the second pattern layer may overlap at least part of the first pattern layer in a thickness direction of the battery cover.

To achieve these and other advantages and in accordance with the purpose of this specification, as embodied and broadly described herein, there is provided a method for fabricating an image module mounted onto a terminal body for providing an externally exposed stereoscopic image, the method including forming a pattern layer protruding from a rear surface of an optically transmissive layer in a shape corresponding to the image, the optically transmissive layer being made of an optically transmissive material, forming a reflection layer covering the pattern layer to reflect at least part of light incident onto the pattern layer toward a front surface of the optically transmissive layer, forming a color layer covering the reflection layer so as to provide a color or texture to the image module, and removing portions, which correspond to an optically transmissive region, from the pattern layer, the reflection layer and the color layer through chemical etching so as to form the optically transmissive region.

In accordance with one exemplary embodiment of the present disclosure, the pattern layer may be formed in a printing or UV molding manner.

In accordance with another exemplary embodiment of the present disclosure, the forming of the pattern layer may be a step of forming first and second protrusions having different shapes or arrangements, so as to provide different stereoscopic effects from each other according to a viewing angle. The first and second protrusions may have different thicknesses from each other or be inclined by different angles with respect to the optically transmissive layer.

In accordance with another exemplary embodiment of the present disclosure, the forming of the reflection layer may be a step of coating or depositing a metal or coating mirror ink on the pattern layer.

In accordance with another exemplary embodiment of the present disclosure, the optically transmissive region may define a logo.

In accordance with another exemplary embodiment of the present disclosure, the method may further include etching the reflection layer through chemical etching so as to have a higher surface roughness.

To achieve these and other advantages and in accordance with the purpose of this specification, as embodied and broadly described herein, there is provided a method for fabricating a battery cover detachably mounted onto a terminal body to provide an externally exposed stereoscopic image, the method including mounting a base member made of synthetic resin onto a jig, forming a color layer having a color or texture on one surface of the base member, forming a reflection layer on the color layer to reflect at least part of incident light, printing a pattern layer on the reflection layer and etching the pattern layer to protrude in a shape corresponding to the image, and forming an optically transmissive layer to cover the pattern layer, wherein the jig may be attachable to or detachable from a different equipment by being coupled to at least one extension jig, if necessary during each step, so as to prevent deformation of the base member due to internal heat between the jig and the base member.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of a mobile terminal and a method for fabricating an image module provided in the mobile terminal according to the exemplary embodiments, with reference to the accompanying drawings.

For the sake of brief description with reference to the drawings, the same or equivalent components will be provided with the same reference numbers, and description thereof will not be repeated. The expression in the singular form in this specification will cover the expression in the plural form unless otherwise indicated obviously from the context. Hereinafter, suffixes "module" and "unit or portion" for components used herein in description are merely provided only for facilitation of preparing this specification, and thus they are not granted a specific meaning or function.

Mobile terminals described in this specification may include cellular phones, smart phones, laptop computers, digital broadcasting terminals, personal digital assistants (PDAs), portable multimedia players (PMPs), E-books, navigators, and the like.

However, it may be easily understood by those skilled in the art that the configuration according to the exemplary embodiments of this specification can be applied to stationary terminals such as digital TV, desktop computers and the like excluding a case of being applicable only to the mobile terminals.

Hereinafter, description will be given in detail of an image module, a mobile terminal having the same and a method for fabricating the image module according to the present disclosure, with reference to the accompanying drawings.

Figure 2:
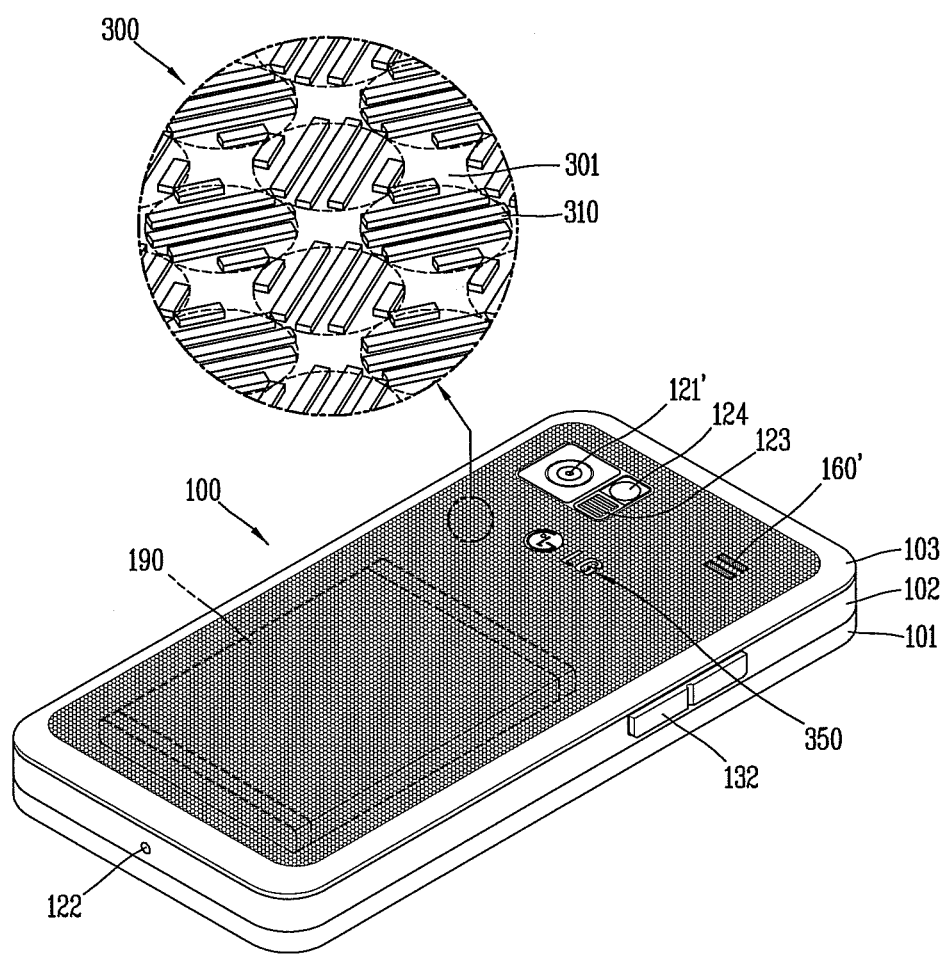
FIG. 2 is a rear perspective view of the mobile terminal shown in FIG. 1.

The mobile terminal 100 shown in FIG. 2 is a bar type mobile terminal. However, this detailed description may be applicable, but not limited to, a various structures, such as a slide type, a folder type, a swing type, a swivel type and the like, having two or more bodies coupled to be relatively movable with each other.

A terminal body may include a case (or referred to as casing, housing, cover, etc.) defining an appearance of the mobile terminal 100. In this exemplary embodiment, the case may be divided into a front case 101 and a rear case 102 covering an opposite surface to the front case 101. At least one intermediate case may further be disposed between the front and the rear cases 101 and 102. A battery cover for covering a power supply unit 190 may be detachably disposed on the rear case 102.

Such cases may be injected using a synthetic resin or be formed of a metal, such as stainless steel (STS), titanium (Ti), aluminum (Al) or the like.

The front surface of the terminal body is shown having a display unit 150, a first audio output module 160, a first camera 121, a manipulation unit 131 and the like, and a side surface thereof is shown having a microphone 122, an interface unit 170, a second manipulation unit 132 and the like.

The display unit 150 may output information processed in the mobile terminal 100. The display unit 150 may be implemented to display (output) visual information using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, or the like.

The display unit 150 may include a touch sensing unit for receiving a control command input in a touch manner. When a portion on the display unit 150 is touched, the touch sensing unit may sense the touch input and a content corresponding to the touched portion may be input. The contents input in the touch manner may include text or numerals or menu items which are instructed or selected in various modes.

Figure 1:
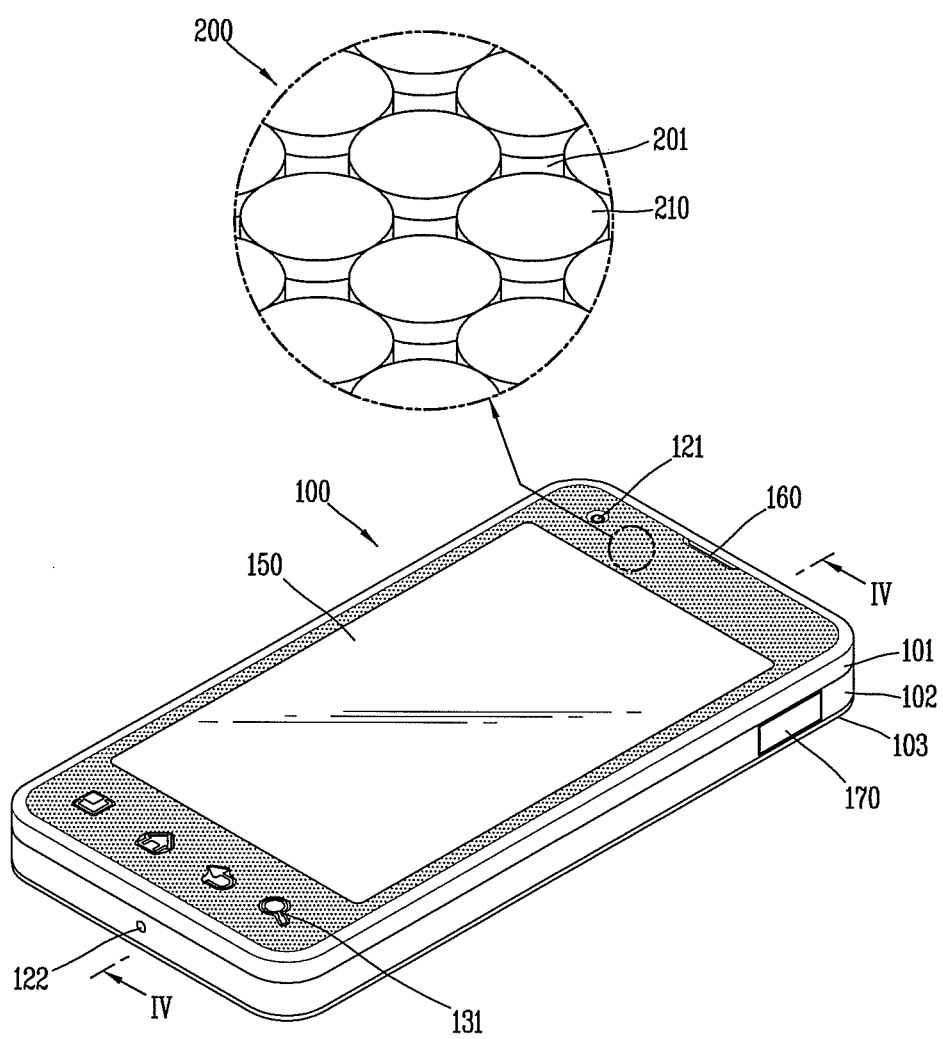
FIG. 1 is a front perspective view of a mobile terminal in accordance with one exemplary embodiment of the present disclosure.

Touch sensing unit may be transparent such that visual information output on the display unit 150 can be viewed, and have a structure for enhancing visibility of a touch screen at a bright place. In FIG. 1, the display unit 150 may occupy most of the front surface of the front case 102.

The first audio output module 160 and the first camera 121 may be disposed at a region adjacent to one of both end portions of the display unit 150, and a first manipulation unit 131 and the microphone 122 may be disposed at a region adjacent to another end. A second manipulation unit 132 (see FIG. 2), an interface unit 170 and the like may be disposed at a side surface of the terminal body.

The first audio output module 160 may be implemented as a receiver to transfer a call sound to a user's ear, or a loud speaker for outputting various alarm sounds or multimedia reproduction sounds.

Sounds generated from the first audio output module 160 may be emitted through an assembly gap between structures. Here, a separately formed hole for outputting sounds may not be viewed or be hidden from the outside, thereby more simplifying the appearance of the terminal 100.

The first camera 121 may receive and process image frames of still pictures or video obtained by image sensors in a video call mode or a capturing mode. The processed image frames may be displayed on a display unit 150.

A user input unit may be manipulated to allow inputting of commands for controlling operations of the mobile terminal 100, and include first and second manipulation units 131 and 132. The first and second manipulation units 131 and 132 may be referred to as a manipulating portion. Such manipulating portion can employ any tactile manner that a user can touch, push, scroll or the like for manipulation.

The drawings illustrate the first manipulation unit 131 as a touch key, but the present disclosure may not be limited to the type. For example, the first manipulation unit 131 may be implemented as a mechanical key or a combination of a touch key and a push key.

Contents input by the first and second manipulation units 131 and 132 may be set variously. For example, the first manipulation unit 131 may be configured to input commands such as menu, home, cancel, search or the like, and the second manipulation unit 132 may be configured to input commands, such as a volume adjustment of sounds output from the first audio output module 160, conversion of the display unit 150 into a touch recognition mode, or the like.

The microphone 122 may receive user's voice, other sounds and the like. The microphone 122 may be disposed in various places to receive stereo sound.

The interface unit 170 may serve as a path for data exchange between the mobile terminal 100 and external devices. For example, the interface unit 170 may be at least one of wired/wireless earphone ports, ports for short-range communication (e.g., IrDA, Bluetooth, WLAN, etc.), power supply terminals for power supply to the mobile terminal and the like. The interface unit 170 may be a card socket for coupling to external cards, such as a Subscriber Identity Module (SIM), a User Identity Module (UIM), a memory card for storage of information and the like.

FIG. 2 is a rear perspective view of the mobile terminal shown in FIG. 1.

Referring to FIG. 2, the rear surface of the terminal body is further shown having a second camera 121'. The second camera 121' faces a direction which is substantially opposite to a direction faced by the first camera 121 (see FIG. 1). Also, the second camera 121' may be a camera having different pixels from those of the first camera 121.

For instance, the first camera 121 may operate with relatively lower pixels (lower resolution). Thus, the first camera 121 may be useful when a user can capture his face and send it to another party during a video call or the like. On the other hand, the second camera 121' may operate with relatively higher pixels (higher resolution) such that it can be useful for a user to obtain higher quality pictures for later use. The first and second cameras 121 and 121' may be installed in the terminal body to be rotatable or popped up.

A flash 123 and a mirror 124 may be disposed adjacent to the second camera 121'. The flash 123 operates in conjunction with the second camera 121' when taking a picture using the second camera 121'. The mirror 124 can cooperate with the second camera 121' to allow a user to photograph himself in a self-portrait mode.

A second audio output module 160' may further be disposed on the rear surface of the terminal body. The second audio output module 160' may cooperate with the first audio output unit 160 (see FIG. 1) to provide stereo output in a phone-call mode.

A broadcast signal receiving antenna (not shown) may further be disposed at the side surface of the terminal body, in addition to an antenna for call connection. The antenna forming a part of the broadcast receiving module may be retractably into the terminal body.

The terminal body is shown having a power supply unit 190 for supplying power to the mobile terminal 100. The power supply unit 190 may be implemented as a battery for converting chemical energy into electrical energy, and the battery may be mounted inside the terminal body or detachably coupled to the terminal body.

Figure 3:
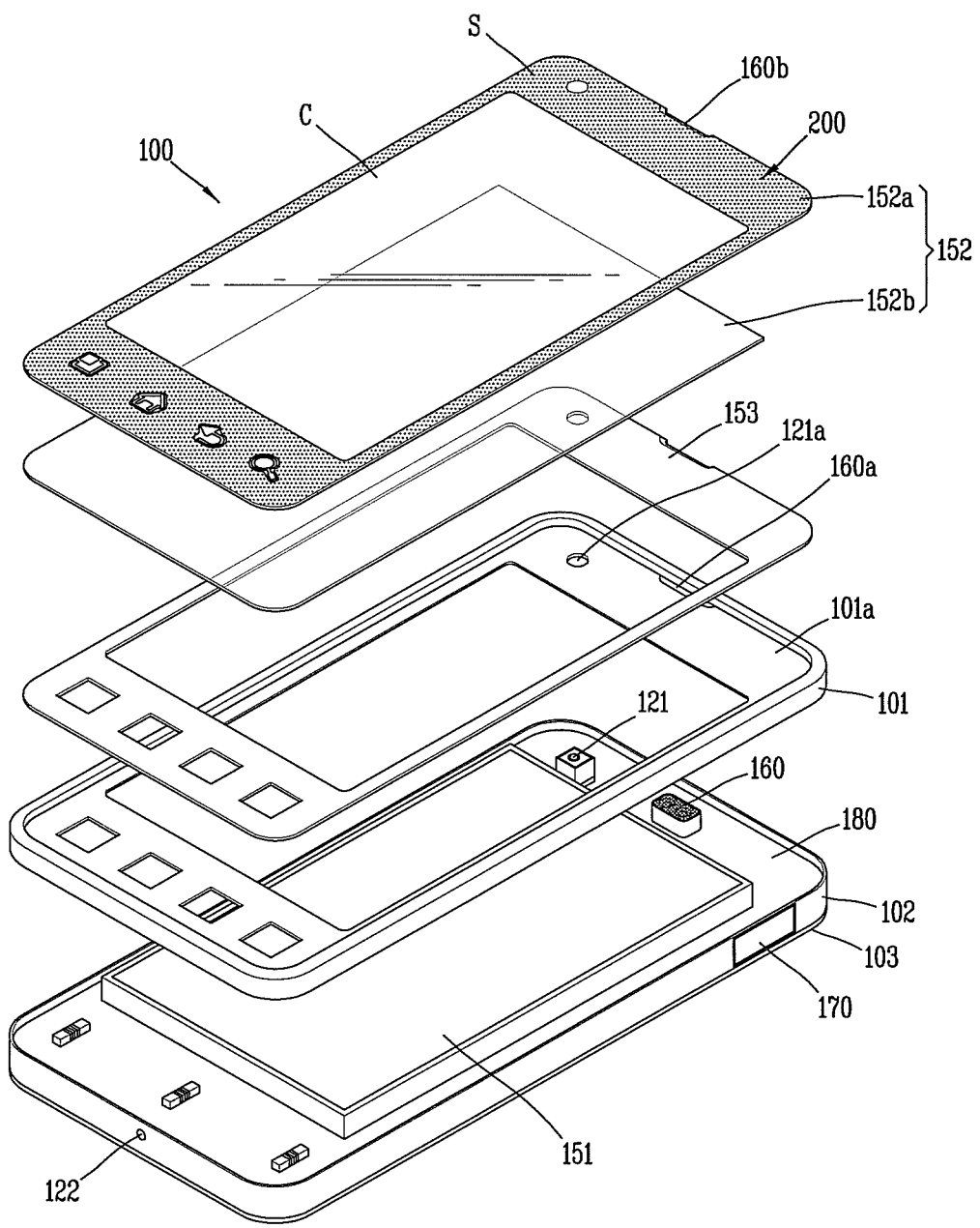
FIG. 3 is a disassembled perspective view of the mobile terminal shown in FIG. 1.

FIG. 3 is a disassembled perspective view of the mobile terminal shown in FIG. 1.

As shown in FIG. 3, a printed circuit board 180 may be mounted within the terminal body. The printed circuit board 180, as shown, may be mounted onto the rear case 102 or installed on a separate internal structure. The printed circuit board 180 may be configured as one example of a controller for activating various functions of the mobile terminal 100. The first audio output module 160, the first camera 121 and the like may be mounted onto the printed circuit board 180.

The display unit 150 (see FIG. 1) for displaying information processed in the mobile terminal 100 may be disposed on one surface of the terminal body. The display unit 150 may occupy most of the front surface of the terminal body. The display unit 150 may include a display 151 and a window section 152 covering the display 151.

The mobile terminal 100 may include a frame for receiving the display 151 therein. This exemplary embodiment illustrates that the frame is formed on the front case 101 defining the appearance of the terminal body. Unlike the drawing, the frame may also be formed as a separate internal structure, which is different from the front case 101.

A receiving portion 101a may be formed on the front case 101. The receiving portion 101a may be recessed into one surface of the front case 101 to form a space on which the window section 152 is mounted. The receiving portion 101a may be provided with a hole 121a corresponding to the first camera 121 and a sound hole 160a corresponding to the first audio output module 160. The sound hole 160a may be disposed adjacent to a side wall of the front case 101.

The window section 152 may be mounted onto the receiving portion 101a. A is transparent portion of the window section 152 may have an area corresponding to the display 151. This may allow a user to recognize visual information output on the display 151 from the exterior.

Also, a recess 160b may be formed on a side surface of the window section 152, which is disposed to face a side wall of the front case 101 to form an assembly gap. With the configuration, sound generated from the first audio output module 160 may be released through the assembly gap between the front case 101 and the window section 152. Consequently, any hole which is independently formed to output sound may not be externally viewed, more simplifying the appearance of the mobile terminal 100.

The window 151 may be disposed on a rear surface of the window section 152 and received in the front case 101, thereby configuring the display unit 150 together with the window section 152. The display 151 may be electrically connected to the printed circuit board 180, to output visual information under the control of the controller. The display 151 may have an area corresponding to the transparent portion of the window section 152.

The display 151, for example, may be at least one of a Liquid Crystal Display (LCD), a Thin Film Transistor-Liquid Crystal Display (TFT-LCD), an Organic Light-Emitting Diode (OLED), a flexible display, a three-dimensional (3D) display, or the like.

The window section 152 may include a window 152a, and a touch sensor 152b disposed on one surface of the window 152a to sense a touch input with respect to the window 152a.

The window 152a may be made of a material through which light can be transmitted, for example, transparent synthetic resin, tempered glass or the like. The window 152a may include a non-transparent portion.

The window 152a may be divided into an edge region S which is processed to be opaque, and a central region C surrounded by the edge region S. The edge region S may be supported by being received in the receiving portion 101a, and the central region C may have an area corresponding to the display 151.

The touch sensor 152b may convert the change of a voltage or charge generated from a particular portion of the window 152a into an electric input signal. The touch sensor 152b may be transparent such that an image formed on the display 151 can be transmitted. A region of the touch sensor 152b corresponding to the transparent portion of the window 152a may define an input region.

The touch sensor 152b may be provided with a conductive pattern which is patterned in a manner of depositing or printing a conductive material onto the window 152a itself or a separate film. Examples of the conductive material may include indium tin oxide (ITO), carbon nano tube (CNT), conductive polymer, $In_2O_3$, $SnO_2$, Au and the like.

The touch sensor 152b may have the form of film, so as to be attached onto the rear surface of the window 152a. Here, an adhesive layer may be disposed between the window 152a and the touch sensor 152b for coupling therebetween. Optical clear adhesive (OCA), super view resin (SVR) and the like may be used as the adhesive layer.

The window section 152 may be firmly fixed onto the receiving portion 101a by means of an adhesive film 153. The adhesive film 153 may seal a gap between the is display 151 and the window section 152 to prevent an introduction of foreign materials, and have a loop shape corresponding to the receiving portion 101a.

As such, the display 151 and the window section 152 may configure the display unit 150, and be modularized into one assembly. Especially, when the window section 152 includes the touch sensor 152b, the display unit 150 may operate as a touch screen.

An image module 200, 300 may be mounted onto the terminal body to externally provide a stereoscopic image (or three-dimensional (3D) image). The image module 200, 300 may give a more sophisticated visual effect by virtue of icon, logo, pattern and the like. The image module 200, 300 may be mounted onto the front case 101, as shown in FIG. 1, to form the front surface of the terminal body or configure the battery cover 103 of FIG. 2.

Hereinafter, description will be given in detail of a mobile terminal 100 on which a more sophisticated image is realized, and a method for fabricating the image module 200, 300 provided on the mobile terminal 100.

Figure 4:
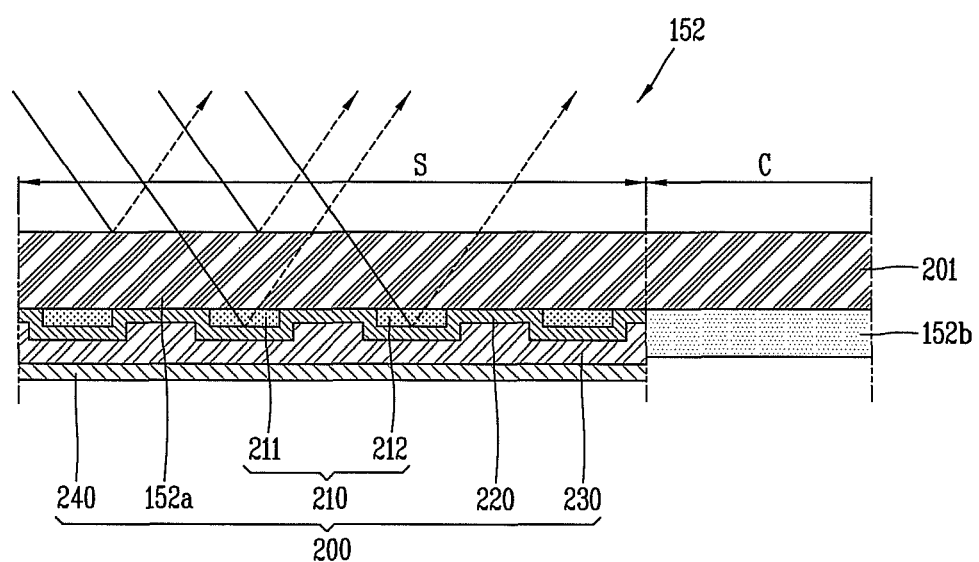
FIG. 4 is a sectional view of the mobile terminal, taken along the line IV-IV of FIG. 1.

FIG. 4 is a sectional view of the mobile terminal 100, taken along the line IV-IV of FIG. 1.

This exemplary embodiment illustrates that an image module 200 may configure the window section 152 and provide a stereoscopic image through the edge region S. The image module 200 may allow a user to feel a three-dimensional (3D) effect (stereoscopic effect, sense of dimension) using an optical property.

The image module 200 may include an optically transmissive layer 201, a pattern layer 210 and a reflection layer 220.

The optically transmissive layer 201 may be made of an optically transmissive (transparent or semi-transparent) material. Examples of the optically transmissive material may include polyethylene terephthalate (PET), polycarbonate (PC), glass and the like. This exemplary embodiment illustrates that the optically transmissive layer 201 is the window 152a.

The pattern layer 210 may be made of an optically transmissive (transparent or semi-transparent) material. The pattern layer 210 may protrude from the rear surface of the window 152a into the shape corresponding to the image. Light transmitted through the pattern layer 210 may be reflected by the reflection layer 220, which will be explained later, thereby realizing the 3D effect in the image.

The pattern layer 210 may be formed in a manner of printing, UV molding or the like using a transparent or semi-transparent material. For the UV molding, for example, the transparent or semi-transparent material may be UV hardener. The UV hardener may have a shape set by a mold (or a die), which covers the rear surface of the window 152a during a molding operation. When the pattern layer 210 is formed through the UV molding, there is an advantage in that a more precise shape can be realized by virtue of the mold.

The pattern layer 210 may include first and second protrusions 211 and 212 disposed with being spaced apart from each other. The first and second protrusions 211 and 212 may be formed to provide different 3D effects according to a viewing angle. A boundary between a portion where the first and second protrusions 211 and 212 are formed and a portion without the first and second protrusions 2110 and 212 may define an outline of the image.

The reflection layer 220 may be formed to cover the pattern layer 210, and reflect at least part of light, which is incident onto the pattern layer 210, toward the front surface of the window 152a. The reflection layer 220 may be formed of a metal or mirror ink so as to reflect light. For example, the reflection layer 220 may be formed by depositing tartar having high luminance on the pattern layer 210, so as to reflect light incident onto the pattern layer 210 toward the front surface of the window 152a and give a metallic texture to the image.

A part of the reflection layer 220 may be removed in an etching manner. For example, a portion of the reflection layer 220, which is deposited directly on the rear surface of the optically transmissive layer 201 without covering the pattern layer 210, may be etched, such that a color layer 230 can be exposed directly to the exterior.

The image module 200 may also be provided with texture or color. To realize this, the color layer 230 which has the texture or color may cover the reflection layer 220. For example, the color layer 230 may be formed by including a metal so as to provide a metallic texture, and implement a background image, separate from the aforementioned image. Also, the color layer 230 may be printed several times to shield structures or electronic devices disposed on the rear surface of the color layer 230.

As shown, a protection layer 240 for enhancement of reliability may be formed on the rear surface of the color layer 230. An adhesive film 153 which is formed to correspond to the edge region S may be attached onto a rear surface of the protection layer 240 such that the window section 152 can be firmly fixed onto the receiving portion 101a.

The pattern layer 210, the reflection layer 220 and the color layer 230 may be formed to correspond to the edge region S of the window 152a. That is, the central region C of the window 152a may be left transparent. A chemical etching may be carried out to remove portions, which correspond to the central region C, from the pattern layer 210, the reflection layer 220 and the color layer 230. In addition, the touch sensor 152b may be disposed to correspond to the central region C so as to sense a touch input onto visual information output on the display 151.

The thusly-configured image module 200 may realize a stereoscopic image with a sense of depth even if it is thin in thickness. Also, with the image module 200 producing various visual effects, the mobile terminal 100 with more aesthetic appeal can be provided.

Hereinafter, description will be given of an exemplary embodiment in which an image module 300 provides different 3D effects according to a viewing angle or realizes a logo by configuring the battery cover 103.

Figure 5:
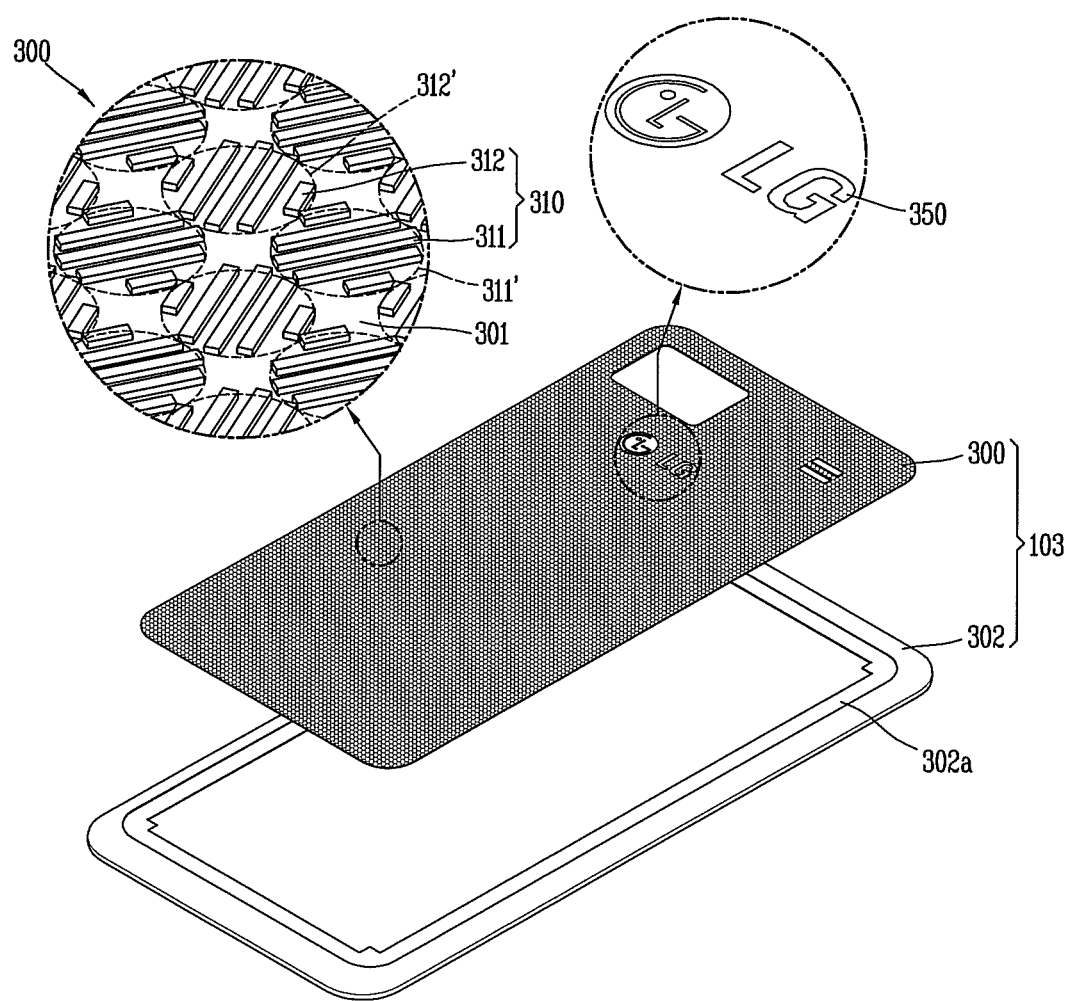
FIG. 5 is a disassembled perspective view of a battery cover shown in FIG. 2.
Figure 6A:
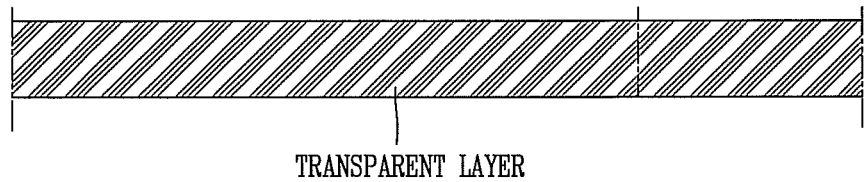
FIGS. 6A to 6F are conceptual views showing fabricating processes for an image module in accordance with the present disclosure.
Figure 6B:
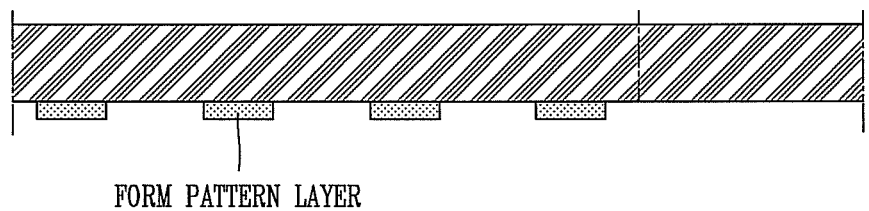
Figure 6C:
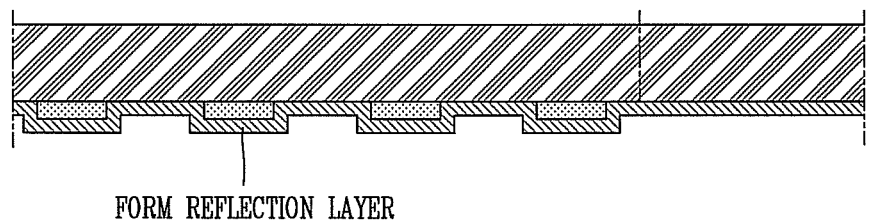
Figure 6D:
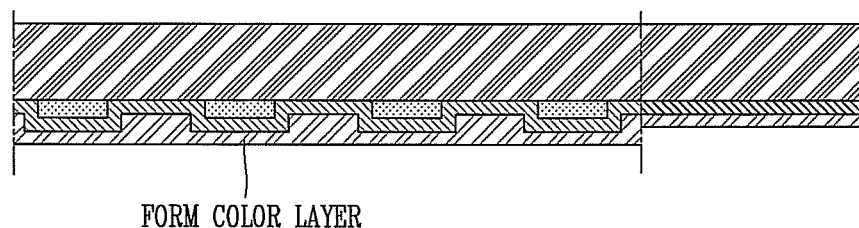
Figure 6E:
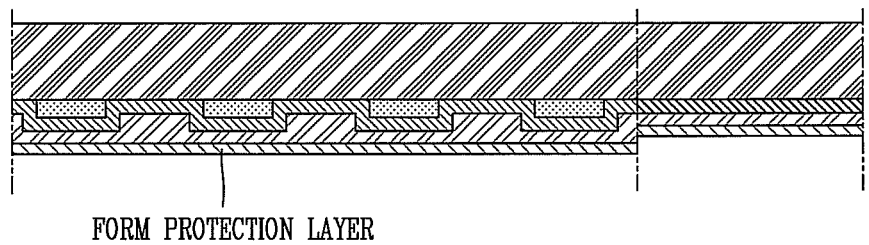
Figure 6F:
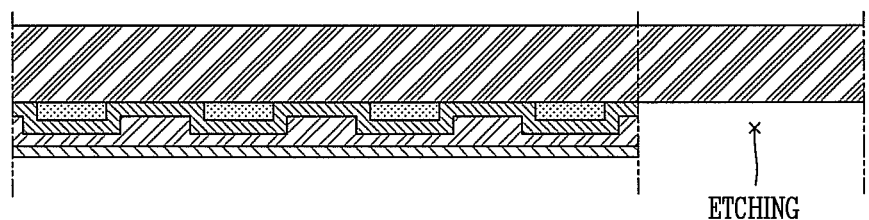

FIG. 5 is a disassembled perspective view of a battery cover 103 shown in FIG. 2. A structure to be explained later is merely illustrative as one example of the battery cover 103 for convenience of explanation, but the present disclosure may not be limited to the structure. For example, for the mobile terminal 100 having a battery mounted therein, the structure to be explained later may be applied even to the rear case 102 which defines a part of the appearance of the terminal.

The reflection layer, the color layer, and the protection layer are not shown in FIG. 5, but are expressed in the specification with the reference numerals 320, 330 and 340, respectively, for coherence with other components.

Referring to FIG. 5, the battery cover 103 may include a frame 302 and an image module 300.

The frame 302 may be detachably coupled to the rear case 102, and include a receiving portion 302a recessed thereinto. The image module 300 may be mounted onto the receiving portion 302a. The receiving portion 302a may support an edge portion of the image module 300.

The image module 300 may be coupled to the frame 302 to define one surface of the battery cover 103. This exemplary embodiment illustrates that the image module 300 is disposed to occupy most of the rear surface of the mobile terminal 100 so as to provide a stereoscopic image onto the rear surface.

A pattern layer 310 in the exemplary embodiment may include first and second protrusions 311 and 312 which provide different 3D effects according to a viewing angle. The first and second protrusions 311 and 312 may extend in different directions along a rear surface of an optically transmissive layer 301. In detail, in the drawing, the first protrusions 311 which extend in a first direction may be formed with different lengths within a first virtual circle 311', and the second protrusions 312 which extend in a second direction, different from the first direction, may be formed with different lengths within a second virtual circle 312'.

With the structure, only light incident onto the first protrusions 311 may be reflected within a predetermined range of angle, so as to realize an effect of glittering in the shape of the first circle 311' as a whole. Here, light incident onto the second protrusions 312 may not be reflected but adsorbed by a color layer 330 or reflected to another direction so as to be invisible to user's eyes. Similarly, only the light incident onto the second protrusions 312 may be reflected within another range of angle, so as to glitter in the shape of the second circle 312'.

In the meantime, the image module 300 may be provided with an optically transmissive logo section 350 which defines a logo of a manufacturer of the mobile terminal 100 or a mobile communication service company. The logo section 350 may be formed by removing portions, which correspond to the logo, from a pattern layer 310, a reflection layer 320 and a color layer 330 in a chemical etching manner.

A pattern plate may be disposed on a rear surface of the logo section 350 to provide texture to the optically transmissive logo section 350. The pattern plate may include a predetermined pattern. The pattern plate may be mounted onto the image module 300 or onto the rear case 102 disposed on the rear surface of the image module 300, such that at least part of the pattern can be exposed through the logo section 350.

Hereinafter, description will be given of a method for fabricating the image module 200, 300 which implements the aforementioned structure. FIGS. 6A to 6F are conceptual views showing fabricating processes for the image module 200, 300 in accordance with the present disclosure.

As shown in FIGS. 6A to 6F, the pattern layer 210, 310 which protrudes in a shape corresponding to an image may be formed on a rear surface of the optically transmissive layer 201, 301 made of an optically transmissive material.

The pattern layer 210, 310 may be formed by printing an optically transmissive synthetic resin (for example, acryl silicon-based resin) onto the rear surface of the optically transmissive layer 201, 301. Here, as a viscosity of the synthetic resin, an angle/pressure upon squeezing the synthetic resin and the like may be adjusted, heights and angles of the first and second protrusions 211 and 212/311 and 312 and an interval between the first and second protrusions 211 and 212/311 and 312 may be controlled.

Or, the pattern layer 210, 310 may be formed to protrude in the shape corresponding to the image in a manner of filling a UV hardener (for example, acrylate-based hardener) into a mold which covers the rear surface of the optically transmissive layer 201, 301 and hardening the UV hardener by irradiating ultraviolet rays. To increase an adhesive force between the optically transmissive layer 201, 301 and the UV hardener, an optically transmissive synthetic resin may be coated or a surface modification through corona or plasma treatment may be carried out.

Next, in order to reflect at least part of light incident onto the pattern layer 210, 310 toward the front surface of the optically transmissive layer 201, 301, the reflection layer 220, 320 having high luminance may be formed on the rear surface of the pattern layer 210, 310. The reflection layer 210, 310 may be opaque or semi-transparent. The step of forming the reflection layer 220, 320 may be a step of coating or depositing a metal having high luminance or coating mirror ink on the rear surface of the pattern layer 210, 310.

Here, a deposition process such as a non-conductive vacuum metallization (NCVM), E-beam, sputter and the like may be carried out. Examples of a material to be is deposited may include an oxide (for example, $TiO_2$, $SiO_2$, etc.), a compound (for example, barium-taltan $SiO_2$, strontium, etc.), and a metal (for example, Sn, Ti, In, etc.).

A thickness of the reflection layer 220, 320 may be set by taking into account transparency and luminance. The reflection layer 220, 320 having the thickness may be implemented through several times of the laminating process.

Afterwards, the color layer 230, 330 which covers the reflection layer 220, 320 may be formed so as to provide a color or texture to the image module 200, 300. The color layer 230, 330 may have non-transparency by being laminated several times such that structures or electronic devices on the rear surface thereof cannot be outwardly exposed. A background image realized by the color layer 230, 330 may produce a unique visual effect together with the image realized by the pattern layer 210, 310 and the reflection layer 220, 320.

Next, to form an optically transmissive region, portions, which correspond to the optically transmissive region, may be removed from the pattern layer 210, 310, the reflection layer 220, 320 and the color layer 230, 330 by chemical etching. The optically transmissive region refers to the removed portion for realizing an image and carrying out functions of electronic devices disposed on the rear surface of the color layer 230, 330. For example, the optically transmissive region may correspond to a key shape of the first manipulation unit 131, a logo of a manufacturer of the mobile terminal 100 or a mobile communication service company, the central region C for outwardly exposing visual information output on the display 151, or the like.

A process of laminating the protection layer 240, 340 for ensuring reliability may be carried out on the rear surface of the color layer 230, 330, if necessary. Also, other well-known processes may be additionally carried out.

Figure 7:
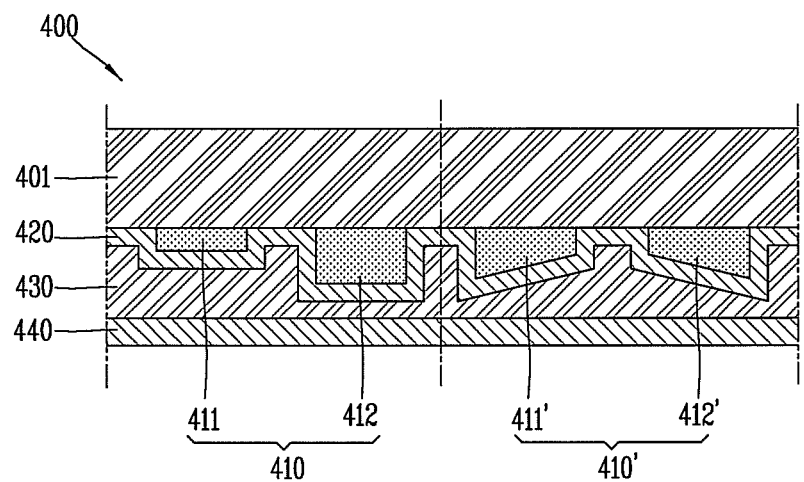
FIGS. 7 and 8 are conceptual views showing another exemplary embodiments of an image module in accordance with the present disclosure.
Figure 8:
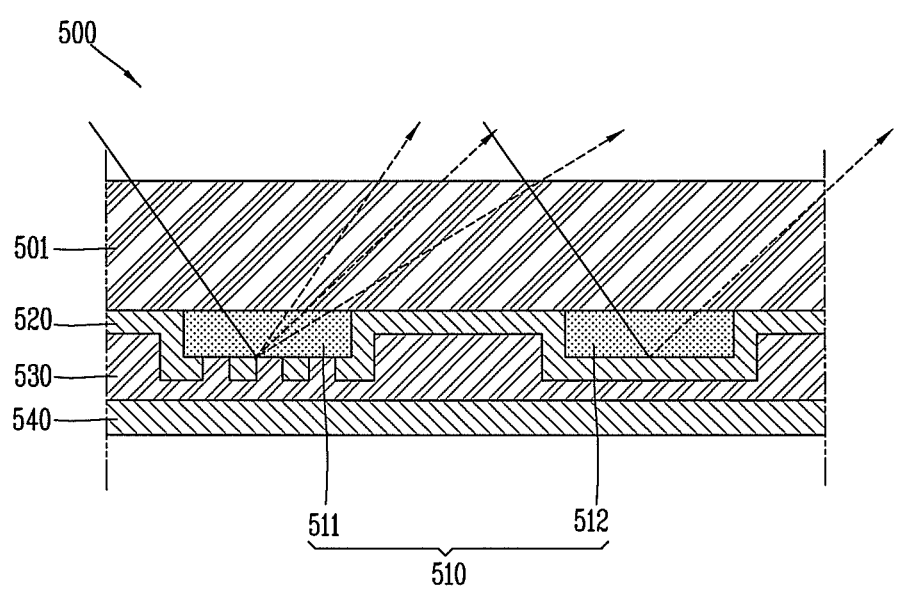

FIGS. 7 and 8 are conceptual views showing another exemplary embodiments of image modules 400 and 500 in accordance with the present disclosure. For the sake of brief description with reference to the drawings, the same or equivalent components will be provided with the same reference numbers, and description thereof will not be repeated.

First, referring to FIG. 7, first and second protrusions 411 and 412/411' and 412' may have different shapes or arrangements from each other to provide different 3D effects according to a viewing angle. The embodiment of realizing different 3D effects according to an angle of viewing the image module 400, 500 by way of the different arrangements of the first and second protrusions 411 and 412/411' and 412' is the same as that illustrated in FIG. 5.

The first and second protrusions 411 and 412/411' and 412' may have different thicknesses (for example, 411 and 412) from each other or be inclined by different angles (for example, 411' and 412') from each other. According to the difference of the shapes, the first and second protrusions 411 and 412/411' and 412' may exhibit different results in a light reflection, a light reflection level and the like, according to conditions of an angle.

The first and second protrusions 411 and 412/411' and 412' may also be disposed to be spaced apart from each other. A color layer 430 may be filled between the first protrusion 411, 411' and the second protrusion 412, 412'. The color layer 430 may be laminated several times so as to form a flat surface in spite of the difference of the shapes between the first and second protrusions 411 and 412/411' and 412'.

Referring to FIG. 8, a reflection layer 520 may be treated by chemical etching to have a high surface roughness. In detail, the rear surface of the reflection layer 520 may be masked in a printing manner, followed by selective etching through the chemical etching, such as pickling, ultrasonic washing and the like. This may allow the surface of the reflection layer 520 to be concave-convex. The surface roughness may have different values depending on a masking method, an etching time and the like.

The reflection layer 520 may have the concave-convex shape through the processes, thereby dispersing light incident onto a pattern layer 510. This may result in producing more various visual effects.

Figure 9:
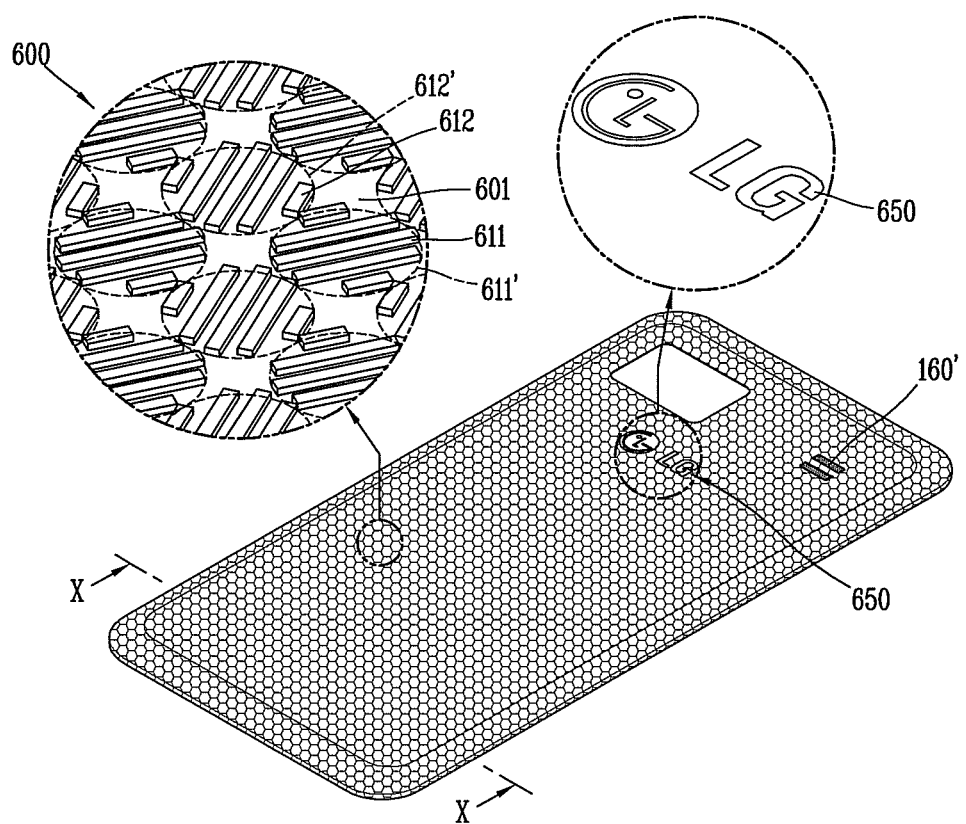
FIG. 9 is a perspective view showing another example of a battery cover in accordance with the present disclosure.

FIG. 9 is a perspective view showing another example of a battery cover 600 in accordance with the present disclosure. The battery cover 600 according to the another embodiment may be surface-processed such that a user can feel the sense of dimension. That is, the battery cover 103 of FIG. 5 has the structure with the image module 300 for providing a stereoscopic image to the frame 302, whereas the battery cover 600 according to this exemplary embodiment with an image module, which is formed by carrying out the surface processing directly onto an injection-molded product as a base member 660. Hereinafter, the same/like components as the image module 300, 400 described above have the same/like reference numerals, and description thereof will not be repeated.

Figure 10:
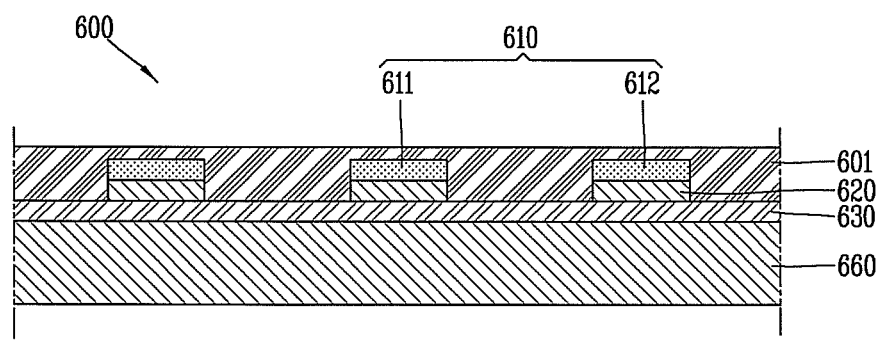
FIG. 10 is a sectional view taken along the line X-X of FIG. 9.

FIG. 10 is a sectional view taken along the line X-X of FIG. 9.

Referring to FIG. 10, the battery cover 600 may be detachably mounted onto the terminal body, and provide an externally exposed 3D image. In detail, the battery cover 600 may include a base member 660, a color layer 630, a reflection layer 620, a pattern layer 610 and an optically transmissive layer 601.

The base member 660 may be formed of synthetic resin, and elastically transformable to be detachable from the terminal body. The base member 660, for example, may be formed of polycarbonate (PC), and include therein glass fiber, carbon fiber or the like which is selectively added for ensuring rigidity.

The color layer 630 may be disposed to cover the base member 660 through printing, deposition and the like. The color layer 630 may have a color or texture, thereby implementing a background image of the battery cover 600.

The reflection layer 620 may be deposited on the color layer 630 to reflect at least part of incident light. Therefore, the at least part of the incident light may be reflected toward the front surface of the battery cover 600, and the reflected light may be refracted by the pattern layer 610. This may allow the user to feel a stereoscopic image. Also, the other part of the incident light may be transmitted through the reflection layer 620 so as for the user to feel texture or color on the color layer 630. The reflection layer 620 may have a shape corresponding to an image through an etching process which will be explained later.

The pattern layer 610 may be formed on the reflection layer 620 in a manner of printing or spraying optically transmissive or colored ink. The pattern layer 610 may have a predetermined thickness. Light transmitted through the pattern layer 610 may be reflected by the reflection layer 620 and then refracted through the pattern layer 610, thereby providing the 3D effect to the image.

The pattern layer 610 may include first and second protrusions 611 and 612 spaced apart from each other. The first and second protrusions 611 and 612 may have different sizes and shapes from each other, thereby providing different 3D effects according to a viewing angle.

After formation of the pattern layer 610, etching and washing processes may be carried out. Here, a part of the reflection layer 620 may be etched off. For example, a portion of the reflection layer 620 without covering the pattern layer 610 may be etched off such that the color layer 630 can be exposed directly to the exterior. During the etching process, the pattern layer 610 may serve as a mask. After the etching process, the washing process may be carried out to remove foreign materials and residues. Accordingly, defect factors in the succeeding processes may be removed.

The optically transmissive layer 601 may be made of an optically transmissive material, and disposed to cover the color layer 630 and the pattern layer 610 through a spraying process. The optically transmissive material may be filled on the pattern layer 610 and in a space between the first pattern layers 610, through which the color layer 630 is exposed, thereby having a flat surface. The optically transmissive material may include, for example, polyethylene terephthalate (PET), polycarbonate (PC) and the like.

In the aforementioned structure, the pattern layer 610 and the reflection layer 620 may be laminated in the reverse order.

Figure 11:
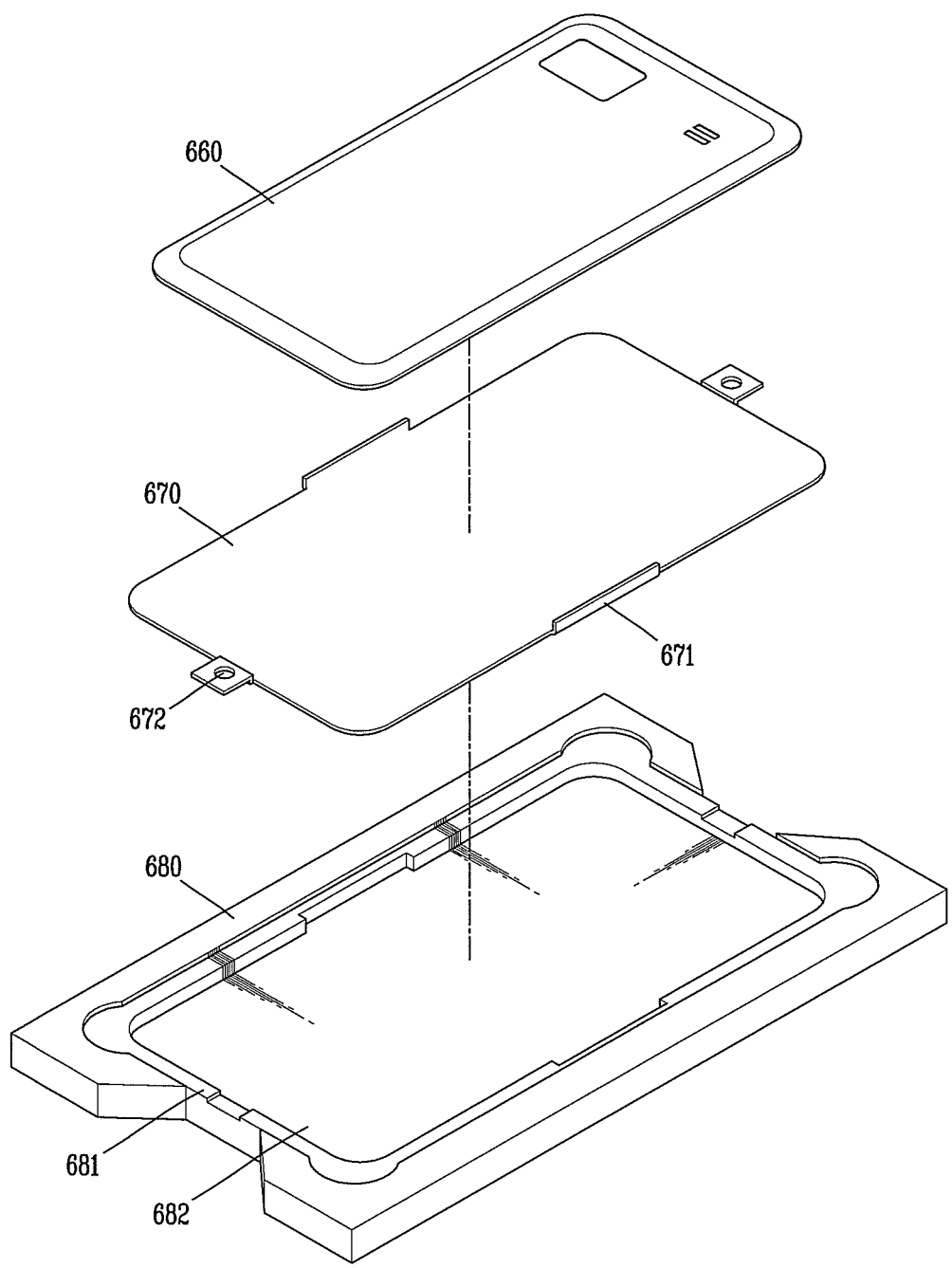
FIG. 11 is a conceptual view showing an example of a jig coupled to a base member shown in FIG. 10 and an extension jig coupled to the jig.

FIG. 11 is a conceptual view showing an example of a jig 670 coupled to the base member 660 shown in FIG. 10 and an extension jig 680 coupled to the jig 670.

Referring to FIG. 11, the base member 660 made of synthetic resin may be fixed onto a jig 670. Support members 671 may protrude from side surfaces of the jig 670. The support members 671 may be disposed to cover side surfaces of the base member 660 when the base member 660 is mounted onto the jig 670. The support member 671 may also be formed to be engaged with equipment. The jig 670 may be firmly fixed onto the equipment by means of fixing members 672. The jig 670 may be provided with a magnet, which allows the jig 670 to be fixed onto a chamber of an evaporator formed of a metal using a magnetic force.

In general, when the jig 670 is replaced by another jig due to a difference of equipment according to a method, the base member 660 may be deformed due to internal heat between the jig 670 and the base member 660. To prevent the problem, the jig 670 may be basically designed to prevent the deformation of the base member 660, and be coupled to at least one extension jig 680, if necessary during a process, so as to be attachable to or detachable from another equipment.

For example, the jig 670 may be fixedly secured with being mounted and received in a mounting portion 681 and a receiving portion 682 of the extension jig 680. The extension jig 680 may be removed at the etching or washing process, for the reason of productivity. Here, the jig 670 may preferably be configured not to be separated from the base member 660 until the final process is completed.

Figure 12:
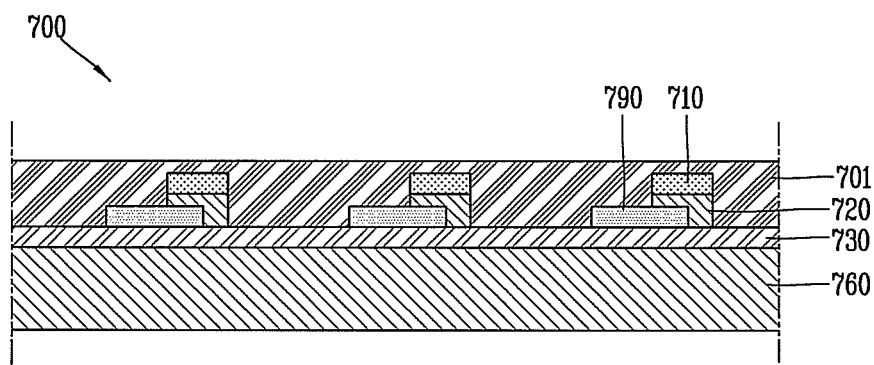
FIG. 12 is a sectional view showing another example of a battery cover in accordance with the present disclosure.

FIG. 12 is a sectional view showing another example of a battery cover 700 in accordance with the present disclosure.

Referring to FIG. 12, a battery cover 700 may further include a second pattern layer 790, which has the same/like structure and function as a first pattern layer 710. The second pattern layer 790 may be formed prior to depositing a reflection layer 720 on a color layer 730, and protrude in a predetermined pattern to realize a 3D image is together with the first pattern layer 710.

As shown in FIG. 12, the second pattern layer 790 may overlap at least part of the first pattern layer 710 in a thickness direction of the battery cover 700. With the structure, the first and second pattern layers 710 and 790 similar to each other may provide different aesthetic appeal from each other, and the overlapped portion between the first and second pattern layers 710 and 790 may produce another aesthetic appeal.

As described above, a pattern layer may protrude from a rear surface of an optically transmissive layer in a shape corresponding to an image, and a reflection layer may be formed to cover the pattern layer, such that at least part of light incident onto the pattern layer can be reflected toward a front surface of the optically transmissive layer. This may result in producing various visual effects, and providing a mobile terminal with more enhanced aesthetic appeal.

Formation of first and second protrusions having different shapes or arrangements may provide different stereoscopic (or 3D) effects according to a viewing angle. The reflection layer may be formed to have a higher surface roughness through chemical etching, such that light incident onto the pattern layer can be dispersed.

In addition, the present disclosure may implement an effective fabricating process for an image module by a method of forming a pattern layer on a rear surface of an optically transmissive layer through printing or UV molding, and depositing a reflection layer to cover the pattern layer, forming a color layer on the reflection layer to provide a color or texture to an image module, and removing a portion corresponding to an optically transmissive region through chemical etching.

The structure and the fabricating method may be applied to form a pattern on a base member as an injection-molded product as well as forming the pattern on the rear surface of the optically transmissive layer. Also, in order to prevent deformation of the injection-molded product due to internal heat between a jig and the injection-molded product as a plurality of processes are carried out on the injection-molded product, the jig may be used as it is until the final process is completed, and an extension jig may be used if necessary.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a body;
    a stereoscopic image module at the body to provide an externally exposed stereoscopic image,
    wherein the stereoscopic image module includes:
        an optically transmissive layer of an optically transmissive material, the optically transmissive layer having a first surface and a second surface;
        a pattern layer of an optically transmissive material, the pattern layer to protrude from the second surface of the optically transmissive layer in a form that corresponds to the stereoscopic image; and
        a reflection layer to cover the pattern layer and to reflect at least part of light incident to the pattern layer toward the first surface of the optically transmissive layer,
    wherein the pattern layer includes a first protrusion and a second protrusion disposed to be spaced apart from each other, and each of the first protrusion and the second protrusion to provide a different stereoscopic effect based on a viewing angle,
    wherein the first protrusion extends in a first direction along the second surface of the optically transmissive layer,
    wherein the second protrusion extends in a second direction, different from the first direction, along the second surface of the optically transmissive layer, and
    wherein a part of the reflection layer is filled between the first protrusion and the second protrusion and contacts the second surface of the optically transmissive layer.

2. The terminal of claim 1, further comprising a display unit having a display and a window section to cover the display, the window section including a window having a central region corresponding to the display and an edge region surrounding the central region,
    wherein the stereoscopic image module is provided at an area corresponding to the edge region of the window.

3. The terminal of claim 1, wherein the stereoscopic image module is provided on a battery cover.

4. The terminal of claim 1, wherein the pattern layer is provided on the optically transmissive material by a printing manner or by an ultraviolet (UV) molding manner.

5. The terminal of claim 1, wherein the first protrusion is a different shape than the second protrusion.

6. The terminal of claim 5, wherein the first protrusion has a different thickness than the second protrusion.

7. The terminal of claim 5, wherein the first protrusion is inclined by a different angle with respect to the optically transmissive layer than the second protrusion.

8. The terminal of claim 1, wherein the reflection layer includes a metal or mirror ink.

9. The terminal of claim 1, wherein the reflection layer is chemically etched to have a surface roughness.

10. The terminal of claim 9, wherein the reflection layer is formed in a concave-convex shape by the chemical etching, to disperse light incident to the pattern layer.

11. The terminal of claim 1, wherein the stereoscopic image module includes a logo section formed by removing at least one portion of the pattern layer and at least one portion of the reflection layer by chemical etching.

12. The terminal of claim 1, wherein the stereoscopic image module further includes a color layer to cover the reflection layer.

* * * * *